Figure 1:
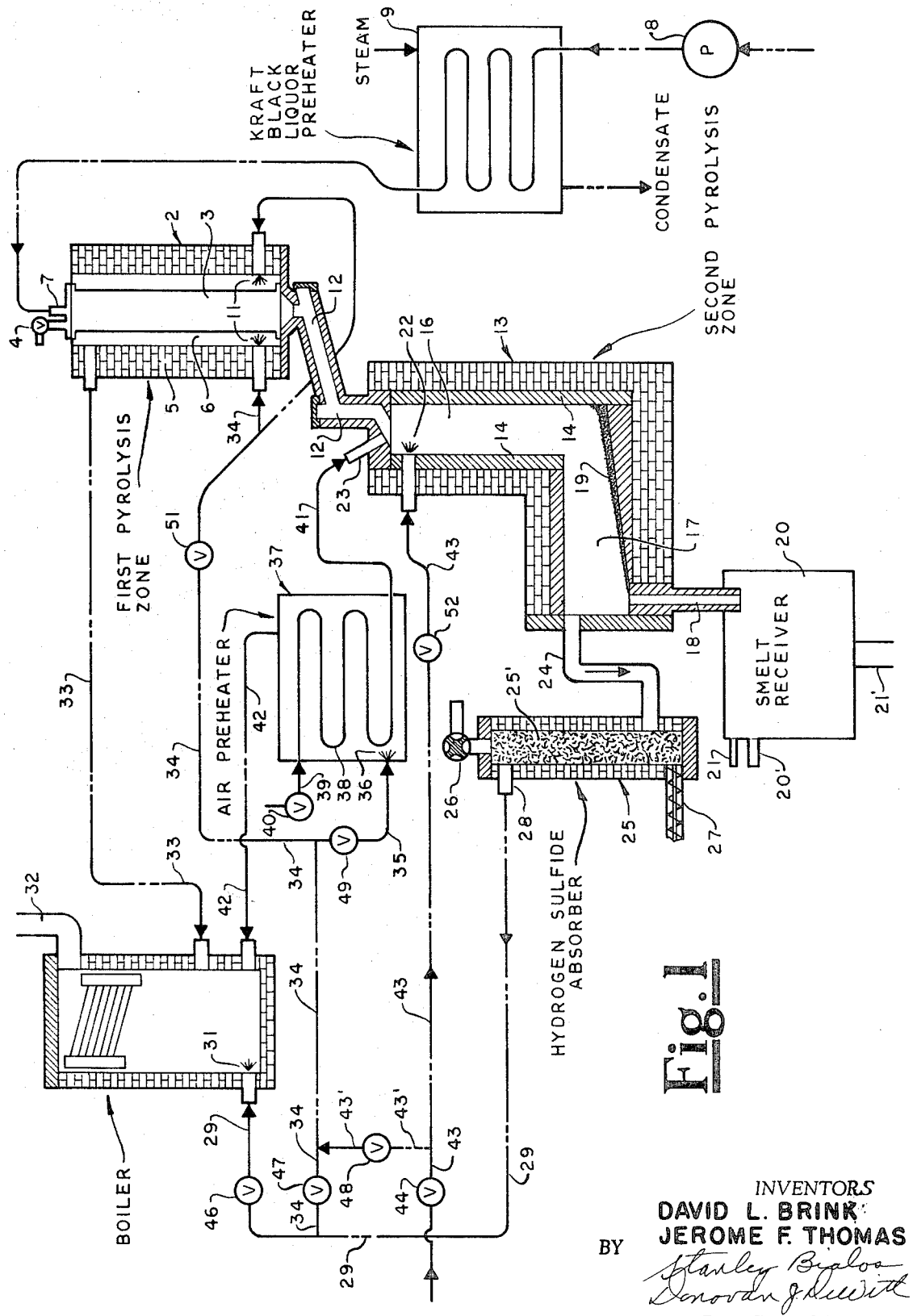

United States Patent [19]

Brink et al.

[11] 3,761,568

[45] Sept. 25, 1973

[54] METHOD AND APPARATUS FOR THE DESTRUCTIVE DECOMPOSITION OF ORGANIC WASTES WITHOUT AIR POLLUTION AND WITH RECOVERY OF CHEMICAL BYPRODUCTS

[75] Inventors: David L. Brink; Jerome F. Thomas, both of Berkeley, Calif.

[73] Assignee: The Regents of the University of California, Berkeley, Calif.

[22] Filed: Feb. 16, 1971

[21] Appl. No.: 115,589

Related U.S. Application Data

[63] Continuation-in-part of Ser. No. 795,288, Jan. 30, 1969.

[52] U.S. Cl.............. 423/207, 23/277 R, 48/197 R, 201/27, 423/562, 260/684
[51] Int. Cl. ...... C01b 17/22, B01j 1/00, C07b 5/00
[58] Field of Search.................. 48/197 R, 203, 209; 201/27, 34; 23/1 R, 48, 134, 181, 262, 277 R; 423/207, 561, 573, 562; 260/684

[56] References Cited
UNITED STATES PATENTS

| | | | |
|---|---|---|---|
| 1,523,845 | 1/1925 | Speer, Jr................................ | 23/181 |
| 1,614,063 | 1/1927 | Frazier.................................. | 23/134 |

FOREIGN PATENTS OR APPLICATIONS

| | | | |
|---|---|---|---|
| 671,026 | 9/1963 | Canada.............................. | 48/197 R |
| 578,711 | 7/1946 | Great Britain....................... | 48/203 |

*Primary Examiner*—Oscar R. Vertiz
*Assistant Examiner*—Hoke S. Miller
*Attorney*—Stanley Bialos and Donovan J. De Witt

[57] ABSTRACT

Organic material, such as kraft black liquor, wood residues, organic fuels and garbage or other organic wastes, is destructively distilled and pyrolyzed at elevated temperatures and for a time sufficient to break down the material to non-combustible solids and a stable, clean-burning gaseous fuel. Said destructive distillation and pyrolysis steps can be effected in a single stage, though preferably they are conductive in successive stages. Valuable organic products can be recovered from the first stage effluent by condensation or otherwise between these stages. The temperature during pyrolysis is maintained at a high enough level and for a time sufficient to preclude undesirable recombination of intermediate products, formed during pyrolysis, to compounds which would otherwise pollute the atmosphere. A controlled amount of oxygen, which can take the form of malodorous emission gases such as those engendered in the operation of a kraft mill or other industrial plant, for example, is continuously introduced during pyrolysis to provide energy by exothermic oxidative reactions. However, the oxygen so employed is insufficient to effect stoichiometric or, in other words, complete combustion of the reaction mixture. Further, the content of water vapor in the pyrolysis zone where cracking is occurring is maintained at a level high enough to insure that carbon particles in said zone will react with water to form hydrogen and carbon monoxide.

The invention described herein was made in the performance of work under research grants from the United States Public Health Service.

18 Claims, 2 Drawing Figures

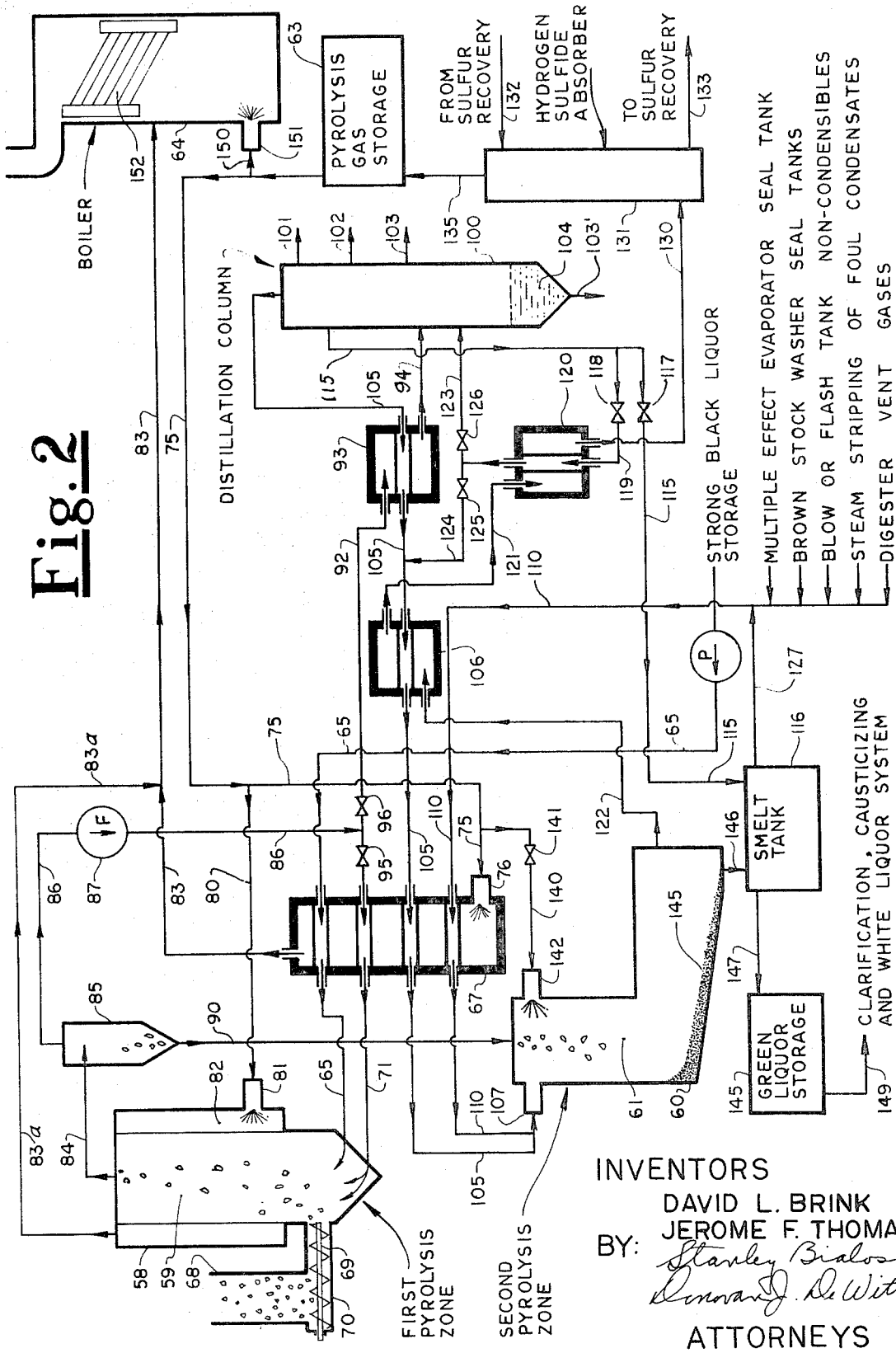

METHOD AND APPARATUS FOR THE DESTRUCTIVE DECOMPOSITION OF ORGANIC WASTES WITHOUT AIR POLLUTION AND WITH RECOVERY OF CHEMICAL BYPRODUCTS

RELATED APPLICATIONS

This application is a continuation-in-Part of copending application, Ser. No. 795,288, filed Jan. 30, 1969, (now U.S. Pat. No. 3,639,111, dated Feb. 1, 1972), and copending application, Ser. No. 12,315, filed Feb. 18, 1970.

BACKGROUND OF THE INVENTION

The pollution caused by the discharge into the atmosphere of various malodorous gases or those resulting from combustion of organic materials is a problem of great concern. For example, in the operation of wood pulping mills such as kraft mills, there is recovered a product known as kraft black liquor which contains sulfur compounds. This liquor is conventionally processed by oxidative combustion to recover inorganic salts, and in this operation various gaseous, malodorous pollutants are formed which are discharged to the atmosphere. Kraft pulping operations, in addition to the aforementioned black liquor, are also productive of a number of gaseous side streams containing minor amounts of malodorous emission products. For example, gases of this character are vented from the smelt tank, the multiple effect evaporator seal tank, the brown stock washer seal tanks, the blow or flash tank non-condensibles and the digester vent gases, as well as in other apparatus stages. These pollutants include malodorous mercaptans and organic sulfides and polysulfides, along with other organic emission gases of an undesirable character from an atmospheric pollution standpoint. Even if the sulfur content of the organic raw material is low or non existant, such as in garbage, wood or other wastes, the atmosphere becomes polluted with a wide variety of degraded and reformed organic products formed by oxidative combustion in an incinerator. Similarly, combustion of fuels such as soft coal, for example, is responsible for formation of substantial amounts of atmospheric pollutants.

It is known that in the combustion of organic material, there is a simultaneous occurrence of endothermic and exothermic reactions during which very reactive intermediate products such as carbon free radical fragments (i.e., free radicals containing carbon), atomic hydrogen, atomic oxygen, hydroxyl free radicals and perhydroxy free radicals, are formed. In typical combustion processes these reactive intermediate carbon free radicals recombine and form gaseous air pollutants such as saturated and unsaturated aliphatics and polynuclear aromatics (arenes).

SUMMARY AND OBJECTS OF THE INVENTION

Pursuant to this invention, it has been found that by destructively distilling and pyrolyzing organic materials above a critical temperature zone and for a sufficient length of time, gases from the material can be reduced or cracked to stable end products which go to make up a simple, stable, clean burning gaseous fuel. By maintaining pyrolysis above such critical temperature for a substantial interval of time, recombination reactions of the unstable free radical and other intermediate products formed during the combustion are prevented thus eliminating formation materials causing pollution. This stable, gaseous end product can be burned, as any other typical fuel, but will burn clean without polluting the atmosphere. Carbon particles are formed during the aforementioned pyrolysis, and it also forms a significant feature of the present invention to provide the pyrolysis zone with sufficient water vapor to insure that said carbon particles will react with water to form carbon monoxide and hydrogen.

Although indirect heating may be used, the pyrolysis process is advantageously rendered self-sustaining by introducing just sufficient oxygen (or an oxygen-containing gas) into the pyrolysis zone to support combustion and produce heat for providing the cracking temperature. However, the amount of oxygen so employed is insufficient to effect complete stoichiometric combustion; and if extensive oxidation of the material were to occur, the heating value of the resulting pyrolysis gases is unnecessarily reduced. While oxygen, air or many other oxygen containing gases can be employed for this purpose, when working to dispose of kraft black liquor, bark pieces, sawdust or other organic waste products associated with a pulping mill operation it forms a preferred feature of the present invention to employ as the source of pyrolysis oxygen one or more of the various available gaseous, malodorous streams which are emitted from the mill.

It is recognized that in a practice of the present invention, and particularly in carrying out the first, or destructive distillation phase of the elevated temperature treatment, a wide variety of organic chemicals are formed which are then decomposed as the reaction mixture is carried to still higher pyrolysis temperatures. When feeding sawdust or other small wood or bark pieces to the unit, the effluent from said first phase contains solid charcoal pieces. In one embodiment of this invention, provision is made for the recovery of said chemicals or charcoal pieces without sending the same to the final pyrolysis stage.

From the preceding, it is seen that the invention has as its objects, among others, the provision of a simple method and apparatus for the destructive distillation and pyrolysis of organic material, especially organic waste material, which will prevent formation of atmospheric pollutants; can be expeditiously performed; will provide a variety of valuable and recoverable organic and charcoal byproducts; will form a clean fuel that can be burned to provide energy; which is applicable to the treatment of kraft black liquor to recover inorganic chemical values contained therein and to obviate formation of malodorous gases; and which will utilize, and render non-noxious, various malodorous gaseous streams emitted at one point or another along the sequence of steps employed in a kraft mill. Other objects of the invention will become apparent from the following more detailed description and accompanying drawings in which each of the two figures represents a schematic view of an apparatus system particularly adapted for the pyrolysis of organic material such, for example, as kraft black liquor or kraft black liquor admixed with various particulate, solid, waste elements.

In greater detail, the invention, as previously stated, is particularly adapted for the treatment of any organic material containing carbon, hydrogen and oxygen such as fossil fuels (i.e., coal and peat) and various organic wastes comprising wood, bark, agricultural residues, and municipal sanitary and solid wastes including garbage. The feed stream containing the organic material may include ions or moieties containing sulfur, as in the case of soft coal or kraft mill black liquor or vaporous emissions of such mills, or halogens such as chlorine in synthetic polymers. Any sulfur or halogen converted to hydrogen sulfide or hydrogen halide during the method hereof can be readily absorbed during a practice of said method. In the combustion of organic material, it is continuously vaporized and (to the extent that desirable organic fractions are not drawn off and recovered) progressively degraded to smaller and smaller fractions which include carbon free radical fragments, atomic hydrogen, atomic oxygen, hydroxyl free radicals, and perhydroxy free radicals as intermediate products. In said combustion of the organic material, solid particles of carbon are also formed, but due to the content of water vapor supplied during pyrolysis, these particles are consumed as they react with water to form carbon monoxide and hydrogen, and thus a build up of a deposit of such particles within the pyrolysis vessel(s) or in other portions of the apparatus is prevented.

Below the critical temperature zone, which is more particularly described below, the carbon free radicals recombine and form pollutants unless prevented from so doing. To prevent such recombination reaction, it has been found pursuant to this invention that if the temperature is maintained sufficiently high and pyrolysis (which involves cracking of the material) is effected in an enclosed zone under reducing conditions, the components of the resultant gas are completely broken down to a stable fuel which consists essentially of molecular hydrogen ($H_2$), methane ($CH_4$), carbon monoxide (CO), and carbon dioxide ($CO_2$). In this connection, carbon dioxide is not considered a pollutant because it naturally occurs in the atmosphere. As a result of such complete cracking, the simple stable clean burning fuel will usually contain, on a dry basis, at least about 40 to 50 percent by volume of molecular hydrogen, with about 15 to 25 percent carbon monoxide, 20 to 30 percent carbon dioxide and about 1 to 5 percent methane. The fuel will also normally contain water vapor.

In the event that the organic material to be pyrolyzed is kraft black liquor resulting from the well-known kraft (sulfate) process in the pulping of wood, and which contains sodium salts, appreciable amounts of organic sulfur compounds, sodium sulfide, sodium thiosulfate, and traces of sodium sulfate, lime, iron oxide, alumina and potash, substantially all the atomic sulfur is converted to sulfide. The sulfide is distributed between sodium sulfide ($Na_2S$) in the ash and hydrogen sulfide ($H_2S$) in the gaseous end product. The hydrogen sulfide can readily be removed from the gaseous fuel by the practice of any one of a variety of available commercial processes.

It is important in conducting the method, that the organic material be completely destructively distilled and pyrolyzed at a sufficiently high temperature and for a sufficient length of time to prevent the aforementioned recombination reactions, and thus produce the aforementioned stable end products. When produced, these end products will not recombine, and the resultant fuel will burn clean in the presence of oxygen and can be employed for energy purposes. As will be explained more fully hereinafter, a portion of the fuel is employed to provide heat energy required to carry out pyrolysis.

The destructive distillation and pyrolysis may be carried out in a single enclosed zone. The temperature at which recombination reactions are substantially precluded and a stable gaseous end product is formed has been found to commence in the temperature range of about 750°C. to 800°C. To insure that no recombination reactions will occur, the pyrolysis is conducted above the upper limit of this 750°C. to 800°C. temperature zone. A suitable temperature range is about 800°C. to 1,200°C. or higher and the time about 1 to 30 seconds. Temperatures above 1,200°C. may be employed but because of the detrimental effect on the equipment in which the pyrolysis is conducted such higher temperatures become increasingly impractical on a commercial basis.

As for time of pyrolysis, it is a function of temperature, decreasing as temperature is increased. The minimum time at any temperature is that required to produce the simple end product fuel from a particular organic feed material while the maximum time is immaterial as once such fuel is formed it remains stable. However, unnecessary time increases costs and thereby adversely affects economics of the process.

Advantageously, for purposes of most effective heating, it is desirable to initiate a reductive pyrolysis of the material in a first zone in which indirect heat is employed and from which the material, either with or without the practice of an intermediate chemical recovery step, is fed, along with any added water vapor required, to a second pyrolysis and destructive distillation zone in which the simple stable clean gaseous end product is formed by the cracking. Whether one or two zones are used, after the gaseous components have been broken down or cracked to the stable end components, they will not combine. Pyrolysis commences at a temperature of above about 200°C. A desirable temperature in this first zone is in the range of about 400°C. to 750°C. At the elevated temperature of the first zone, a certain amount of destructive distillation occurs. The water present in the feed is vaporized as are many other organic chemicals which are either present in the feed or formed therein as a result of the reactions which occur at these first zone temperatures. The solid residue from the first zone, together with requisite water vapor and gases remaining after any chemical condensation step practiced with the first zone gaseous effluent, are transferred to the second zone in which the pyrolysis is completed. Time in the first zone is not critical and can be selected to achieve maximum overall process efficiency; 1 to 20 seconds will normally suffice but may be extended if such extension does not adversely affect economics of the process.

In the first zone, external heat is applied to an enclosed vessel in which the initiation of the pyrolysis is conducted so that indirect heating of the feed material is employed. The vessel is made of material, desirably stainless steel, which is resistant to corrosion and erosion at terperatures below about 750°C. Thus, the material of the vessel determines the maximum temperature of the first pyrolysis zone. For insuring a satisfactory rate of initial pyrolysis, the temperature should be above about 400°C.; and to prevent corrosion of the vessel, the temperature should be less than about 750°C.

In the pyrolysis zone wherein the temperature is sufficiently high ( the second zone when two zones are employed) to form the simple stable clean burning fuel, external heat may be applied to maintain the temperature but is impractical with current commercial construction materials because of low heat transfer coefficients of these materials. In order to achieve the requisite cracking temperature in such zone, it is desirable and advantageous to introduce a controlled amount of oxygen which initiates exothermic oxidative reactions to supply and maintain that amount of heat necessary to bring the temperature in such pyrolysis zone in the desired range of 800°C. to 1,200°C. In this connection, the term "oxygen" herein, is to be construed as including air which is employed as the source of oxygen. As indicated above, the term also includes one or more of the various malodorous gases containing oxygen emitted from the various units of a kraft pulping operation. In addition, gaseous effluents not containing oxygen, but containing significant amounts of malodorous gases, may also be processed.

The amount of oxygen which is introduced should be at a minimum, just sufficient to maintain the cracking temperature desired, which will vary with the type of material being pyrolyzed and equipment configuration and design. Oxygen over this minimum can be employed but then the resultant pyrolysis gas from the cracking zone will be diminished in fuel value which is to be avoided as this would result in loss of energy production when the pyrolysis gases are subsequently burned as fuel.

Generally, the amount of oxygen should be up to about 15 percent of that amount of oxygen required for complete stoichiometric combustion to achieve the pyrolysis temperature in the range of 800°C. to 1,200°C. The oxygen is introduced at a point source in the pyrolysis zone such that it reacts continuously with combustible gases and carbon, and thereby is continuously and entirely consumed in a limited combustion section of the pyrolysis zone thus obviating build up in the concentration of free oxygen in the pyrolyzing gases. Also, since the oxygen is entirely consumed in this limited section, as the gases and material move from such section, the transitory oxidative conditions thereat reconvert to reductive conditions under which cracking and pyrolysis are sustained. If sufficient external heat can be employed to reach the desired temperature, the need for oxygen is obviated, and the entire pyrolytic process is under reducing conditions.

Along with the oxygen introduced into the pyrolysis zone, there should also be supplied water vapor in an amount well in excess of the amount required to react with the carbon particles in said zone and to supply water for the other reactions (such as with methane) taking place in said zone in which water plays a part. The water present in the various organic wastes adapted to be treated by the present invention will be sufficient in most cases to supply the requisite excess of water vapor. However, when dealing with dehydrated wastes, or when so practicing the invention as to condense out water (along with higher boiling chemical fractions) from the vaporous portion of the effluent from the first pyrolysis zone referred to above, then care must be taken to supply an excess of water vapor to the second pyrolysis zone operated at 800° to 1,200°C. The excess of water should be such that the hot, clean burning effluent fuel gases from the second pyrolysis zone contain at least 10 mole percent water vapor, and preferably contain from 20 to 30 mole percent water vapor. As a practical matter, the content of the water vapor in the fuel gas emissions from the second zone can be monitored by suitable analytical equipment to determine their water vapor content. When the instrument shows no water vapor or an insufficient amount thereof in the fuel gas to properly carry out the reactions requiring water by the provision of said excess, then the content of water vapor in the feed to the second zone may be increased in the desired amount.

As a typical example of the method hereof as applied to kraft black liquor wherein no provision is made for the recovery of charcoal or chemicals between zones, reference is made to the schematic drawing of FIG. 1. A first pyrolysis unit 2 is provided comprising an upright stainless steel cylindrical vessel 3 which is the first pyrolysis zone and is about 6 feet in height and 8 inches in diameter; the vessel being provided with a safety valve 4 and being enclosed in a refractory furnace chamber 5 providing annular heating space 6 about the vessel. Kraft black liquor is continuously sprayed into the vessel through the top thereof by spray nozzle 7 through which it is fed by pump 8; the liquor being preheated to any suitable temperature in preheater 9. Burners 11 are appropriately located in chamber 5 to apply the requisite heat to vessel 3. In vessel 3 liquid is flash dried to dry solids and pyrolysis is initiated.

From zone 3 the partially pyrolyzed material flows by gravity through conduits 12 into the second pyrolysis and destructive distillation unit 13 wherein the final stable clean burning gaseous end product is produced. Because of the high temperature to which the material is subjected in this unit, the inside wall surfaces are lined with basic ceramic refractory lining 14. Unit 13 has as its pyrolysis zone an upright portion 16 rectangular in cross-section and a generally horizontal portion 17, also rectangular in cross-section, communicating with the bottom of upright portion 16, both of which are about 6 feet long.

Vertical portion 16 is about 1 foot wide and three-fourths of a foot deep; and the horizontal portion is about one foot in height at its inlet end and about 1½ ft. in height at the opposite discharge end; the depth being the same as that of the vertical portion. The floor of the horizontal portion slopes downwardly to a sump at the smelt discharge spout 18 which conducts the resultant smelt, indicated at 19, into a smelt receiver tank 20 having gas vent 21 leading to any suitable water seal trap (not shown), and serving the same function as the smelt tank employed in the conventional kraft black liquor recovery process. As usual in such process, tank 20 contains a weak alkaline aqueous liquor continuously fed into the tank through inlet 20' and in which the smelt is dissolved to form so-called green liquor which flows from the tank through outlet 21' to be treated further in the recovery process.

At its upper end, the vertical portion 16 is provided with a burner 22 for burning supplemental fuel to bring the second pyrolysis zone up to temperature in the start up operation. When the operating temperature is reached, firing with supplemental fuel is discontinued and operating temperature is sustained by introduction of air through inlet 23 at the upper end of vertical portion 16, which renders the pyrolysis self-sustaining as was previously described.

Stable clean burning fuel flows out of outlet 24 at the discharge end of horizontal portion 17 into absorber 25 into which any suitable alkali 25' which will absorb hydrogen sulfide, such as calcium oxide or calcium carbonate, is continuously charged through rotary sealing valve 26 and continuously removed by sealed screw conveyors 27. The resultant clean burning combustible fuel flows out of outlet 28 of the absorber, and is conducted by tubing 29 through tubing 34 to burners 11 of the first zone 2 to effect continuous initiation of pyrolysis of the feed material in vessel 3. Air introduced into second reaction zone 13 is desirably preheated to minimize the amount of air required for achieving the desired temperature. For this purpose, pyrolysis gas is conducted by tubing 35 which is connected to tubing 34 and to a burner 36 supplying heat to preheater 37 containing coil 38 connected to air inlet pipe 39 into which requisite air is admitted by a control valve 40 connected to a suitable blower (not shown). Coil 38 is also connected by tubing 41 to air inlet 23. The combustion gases from preheater 37 are conducted by tubing 42 to the boiler where its residual heat is utilized.

Because of the complete pyrolysis in the second pyrolysis zone 13, there is considerable excess energy available; and the excess of stable fuel formed therein is conducted from tubing 29 to burner 31 of a boiler for generating steam; the burner gases being discharged from the boiler stack 32. Flue gases produced by burners 11 in the first zone 2 are also conducted to the boiler by tubing 33.

When once started, the process is self-sustaining. However, to bring the system up to temperature to start the same, supplemental fuel must be employed to supply the necessary heat, and desirably natural gas is used, or, in its absence, other fuel. This gas is conducted from a suitable source thereof by tubing 43 to second pyrolysis zone burner 22; and a valve controlled bypass line 43' is connected to tubing 43 to conduct some of the gas through line 34 to burners 11 of the first pyrolysis unit, and through line 35 to burner 36 of air preheater 37.

A main valve 44 in line 43 controls the supply of supplemental fuel. As indicated in the drawing, additional valves 46, 47, 48, 49, 51 and 52 are provided at suitable locations to appropriately control gas flow during the start up and pyrolysis operations. After the requisite temperatures have been established, the flow of supplemental fuel is discontinued, and the system is operated continuously. In this connection, during start up valve 47 is closed to preclude back flow of supplemental fuel through line 29 into absorber outlet 28, but is maintained open after start up when the supplemental fuel is shut off by valve 44.

In the case of the schematically shown apparatus of FIG. 1, typical conditions for effecting complete destructive distillation and pyrolysis of kraft black liquor to the simple clean burning fuel end product are as follows:

Kraft black liquor, composed essentially of degradation products of lignin and carbohydrates solubilized by sodium hydroxide and sodium sulfide in the wood pulp operation, and containing about 50 percent solids after concentration, is continuously fed by pump 8 through preheater 9 maintained at a desirable temperature of about 220°C. The rate of continuous feed through spray nozzle 7 is about 2 lbs. of the concentrated liquor per minute. The residence time of the continually flowing material in vessel 3 is about 10 seconds; the mean temperature of the wall of the vessel being maintained at about 600°C. At this temperature and time the destructive distillation and pyrolysis has commenced; and by the time the material flows by gravity from the vessel 3 it has been flash dried to complete solids with attendant formation of water vapor and other gases which are present, along with the solids, in the feed stream to the second reaction zone.

The temperature in the second reaction zone is maintained at about 900°C. to 1,200°C. with the maximum temperature being attained downstream of air inlet 23, the total time of passage through the second zone being about 10 seconds which is sufficient to obtain complete cracking without formation of intermediate recombination reaction products. To achieve the temperature for maintaining this pyrolysis and destructive distillation self-sustaining, about 0.6 lb. of air per pound of black liquor (containing about 50 percent solids) is fed into air inlet 23 of the second reaction zone. Air is heated in the preheater to about 1,000°C.

The above temperatures and times for the cracking of kraft black liquor are merely by way of example. All that is necessary for treatment of such liquor, as well as for other organic material, is to heat at a sufficiently high temperature, in the presence of water vapor, and for a sufficient residence time in an enclosed zone so as to prevent recombination reactions and thus form as the gaseous end product a simple clean burning fuel comprising a gaseous mixture of hydrogen, carbon monoxide, carbon dioxide and methane. In the case of black liquor at such cracking temperature substantially all of the sulfur in the pyrolysis gas is present as hydrogen sulfide which is scrubbed out. This simple gaseous mixture when burned results in an exceedingly hot clean flame because of the nature of the fuel. Inasmuch as substantially all the sulfur is reduced to sulfide which is removed as previously described, the combustion products of the pyrolysis gas are odor-free.

In the foregoing example, although the solids concentration of the kraft black liquor is about 50 percent this is not critical inasmuch as relatively solid organic materials as well as liquids, and liquid material containing solids can be pyrolyzed by the method hereof. However, where the moisture content is relatively high, it is preferable to reduce the moisture content by evaporation to an optimum value in order that heat requirements to achieve the desired elevated cracking temperature are thus minimized. Generally, concentration to about 40 percent to 60 percent solids is satisfactory but if the material originally contains less than 40 percent solids it need not be concentrated.

In the example given above (FIG. 1), the kraft black liquor employed as feed contains approximately 50 wt. percent each of water and solids, the effluent fuel gases in conduit 24, as discharged from the second pyrolysis zone 13, contain about 50 to 60 mole percent of water vapor.

In other typical operations conducted in essentially the same fashion as recited above in connection with the description of FIG. 1, and assuming a temperature of 600°C. in zone 2 and one of 1,000°C. in zone 13, there is employed one of each of the feeds recited below in the Table. Also given in the Table are the water vapor contents of the respective gaseous streams passing through conduit 12 from the first pyrolysis unit 2 to the second pyrolysis unit 13, as well as the water vapor content of the effluent fuel gas stream in conduit 24 from unit 13.

TABLE

| Feed | Water Vapor content of gases in Conduit 12 | Conduit 24 |
|---|---|---|
| Particulate wood – 50 wt. % $H_2O$ | 80 mole % | 25 mole % |
| Garbage – 35 wt. % $H_2O$ | 62 mole % | 28 mole % |
| Kraft Black Liquor – 56 wt. % $H_2O$ | 85 mole % | 60 mole % |

A second typical example of the present invention is shown in the schematic drawing of FIG. 2 wherein various of the valves, pumps, compressors and instruments for determining and controlling temperature, flow rates and the like have been omitted, the nature and arrangement of these items being obvious to those skilled in the art in the light of the present description. The figure illustrates apparatus adapted to receive a mixture of kraft black liquor and solid organic waste particles wherein provision is made to process the effluent from a first pyrolysis zone to recover desired portions thereof, with the residue then being sent to a second pyrolysis zone.

Referring more particularly to FIG. 2, a first pyrolysis unit is shown generally at 58, said unit having the same general construction as unit 2 except that here provision is made for the upward rather than downward passage of the solid and liquid feed components through an inner vessel 59 which constitutes the distillation and pyrolysis zone of the unit. Shown generally at 60 is a second pyrolysis unit with a pyrolysis zone 61, said unit having the same general construction as the unit 13 of FIG. 1. Unit 60 receives solids from the first pyrolysis unit 58, along with gases and vapors from said first unit which have not been condensed out and recovered.

Kraft black liquor is continuously pumped from storage through line 65 into a lower portion of the first pyrolysis zone 59, where it is released upwardly as a spray, line 65 passing through a preheating zone 67 which brings the liquor to elevated temperatures for introduction into the pyrolysis unit. Solid organic waste particles, which can represent particulate wood, sawdust, bark or garbage, for example, as stored in hopper 68, are discharged into zone 58 by a conveyor 69 having a screw 70, the particles so introduced being fluidized and moved upwardly through the zone under the influence of the black liquor spray and a stream of driven gas, admitted through line 71, which is recycled from the upper, discharge portion of zone 59, as explained below.

The clean burning fuel gas produced by the apparatus hereof (as discharged from the second pyrolysis unit 60 and freed of hydrogen sulfide) is stored in a tank 63 for release as required for fuel purposes through line 75. From said line the gas flows to a burner 76, where the resultant flame in preheater 67 serves to heat the interior thereof. Another portion of the fuel gas is directed from line 75 through line 80, this portion passing to a burner 81 which heats the space 82 about pyrolysis zone 59. The hot gases from preheater 67 are exhausted through line 83 and, together with those in line 83a from the space 82, are passed to a boiler 64.

The vaporized and partially pyrolyzed materials from zone 59, including both solid as well as gaseous components, are continuously discharged through line 84 into a conventional cyclone separator unit 85. Most of the gases introduced into this unit are discharged through line 86, they being drawn out of the separator by a fan 87 which transfers the gas through line 86 to the lines 71 and 92 at the pressure necessary to develop the required gas flows therein. The balance of the gases admitted to separator 85, along with solid particles so introduced, is discharged at the bottom of the separator for passage through line 90 into the second pyrolysis zone 61.

As noted above, the gases from fan 87 in line 86 are in part recycled via line 71 through preheater 67 to zone 59 where they serve to supply heat thereto as well as to carry the feed elements upwardly through said zone and out line 84. The balance of these gases (the particular proportion depending on the setting of valves 95 and 96) is directed through line 92 and cooled by passage through heat exchanger 93 before being discharged via line 94 into a fractional distillation column 100. This column is provided with typical communicating plates or trays (not shown), and leading off from the column at various upper levels are condensate liquid draw-off lines 101, 102 and 103 through which valuable organic chemical-containing liquids may be removed for subsequent separation into component chemicals such as methanol, acetone, aqueous acetic acid, benzene, toluene, dimethyl sulfide, xylenes and various phenolic derivatives. A heavy condensate 104 in the bottom of the column is shown as being drawn off to produce recovery through line 103'. Streams of organic compounds of no commercial value are returned (not shown) to serve as fuel in an appropriate combustion zone (burners 81, 76 and 151). Alternatively, such streams may be passed through zone 61.

A side stream rich in water is withdrawn at an upper level in column 100 through line 115. Depending upon the setting of valves 117 and 118, a portion of this aqueous stream is sent to smelt tank 116 to provide part of the water there required. The balance of the stream in line 115 passes through line 119 and heat exchanger 120 which serves to heat this portion of the aqueous stream. Depending on the setting of the valves 125 and 126, a portion of the heated aqueous stream is recycled to the said column through line 123, while the balance passes via lines 124 and 105 through heat exchanger 106 and preheater 67 before being discharged to the second pyrolysis zone 61. Line 124 thus carries, in effect, such additional water as may be required to provide the necessary excess of water vapor in the said pyrolysis zone 61.

Uncondensed vapors from column 100 are withdrawn through line 105 and, after being heated by passage through heat exchangers 93 and 106 and preheating zone 67, and injected through inlet 107 into the second pyrolysis zone 61 for partial combustion therein. This combustion, along with that of materials introduced through line 90, is supported by a supply of air from various kraft mill sources, as shown in the drawings, which passes through line 110 for discharge through the inlet 107. As explained above in connection with FIG. 1, the amount of oxygen supplied to zone 61 in this fashion is only a small fraction of that required to support complete combustion, thus providing a reducing atmosphere in the zone.

At its upper end, zone 61 is also provided with a burner 142 which, on start up is supplied with supplemental fuel gas from tank 63 (or from any alternate fuel source, not shown) supplied through lines 75 and 140 when valve 141 is open. Said gas is burned until the pyrolysis zone 61 is brought up to operating temperature. As said temperature is reached, firing with supplemental fuel is discontinued and operating temperature is thereafter sustained by introducing air through the inlet 107, as previously described.

In operation, the pyrolysis zone 61 generates both a simple, stable, clean-burning gaseous end product and a smelt containing various sodium salts. The gas is taken off from zone 61 through a line 122 and is cooled by passage through a heat exchanger 106, line 121, heat exchanger 120 and line 130 before reaching an absorber 131 where hydrogen sulfide present in the gas is removed. In operation, a suitable absorbent material is continuously passed into the absorber via line 132, while the resulting $H_2S$-containing absorbent is continuously taken out through line 133. The fuel gas, now substantially free of hydrogen sulfide, is then passed through line 135 to pyrolysis gas storage in tank 63.

It forms a feature of the present process that sulfur which can be produced and recovered in regenerating the absorbent material can then be reacted with sodium sulfide present in the white liquor (see line 149) to form sodium polysulfide. The performance of this product, as a wood pulping agent, is superior to that of the sodium sulfide which, for reasons of economy, is more conventionally used in such pulping operations. However, this economic disadvantage is overcome by the present on-site provision of a source (the $H_2S$ gas) from which elemental surfur can readily be obtained and then economically used.

The smelt produced in zone 61, which is shown at 145 as flowing down the slanting floor of the pyrolysis unit, is carried by line 146 into smelt tank 116. This tank, which receives from line 115 a part of the water required to form the desired green liquor ( with the balance of the water being supplied from other sources, not shown), is provided with a vent line 127 through which noxious gases pass to line 110 for ultimate reaction in zone 61. The green liquor is then sent through line 147 to storage tank 145 from which it is withdrawn through line 149 for ultimate conversion to white liquor.

Once the plant is in operation, with zone 61 having reached the desired operating temperatures, the pyrolysis gases from tank 63 which are not burned in providing heat for zone 59 or for preheater 67 are fed via line 150 to burner 151 in boiler 64, thus providing a large portion of the heat supplied to the boiler.

While this invention has been described in conjunction with preferred embodiments, it is obvious that many modifications and changes therein can be made by those skilled in the art without departing from the spirit and sense of this invention as defined by the appended claims. Thus, for example, the organic waste material supplied to the first pyrolysis zone 59 can be made up entirely of particulate solids such as sawdust or small pieces of wood or bark which are converted to charcoal in zone 59. The effluent from this zone can then be processed so as to recover said charcoal, as well as condensate from the gaseous portion of the effluent, if desired, with the remainder of the effluent then being passed to the second pyrolysis zone 61. Again, the water in line 115, instead of being discharged into smelt tank 116 could be used as wash water in a lime mud washing step, as practiced in a kraft mill, with the water effluent from this step being passed to tank 116. In still another embodiment, water present in line 130, along with $H_2S$-containing gases, could be removed and not discharged into absorber 131. Water so removed could then be used in connection with the smelt tank or the line mud washing step, as discussed herein.

We claim:

1. The method of preventing formation of atmospheric pollutants in the combustion of organic material which comprises effecting destructive distillation and pyrolysis of such material in an enclosed zone in the presence of an excess of water vapor and at an elevated cracking temperature and for a sufficient time to form as the gaseous end product a stable clean burning fuel containing at least 10 mole % water vapor to insure that carbon particles will react with water to form carbon monoxide and hydrogen while maintaining such temperature to preclude recombination reactions of intermediate products comprising carbon free radicals formed during such destructive distillation and pyrolysis and thus prevent formation of gaseous saturated and unsaturated aliphatic and polynuclear aromatic air pollutants, and allowing such stable gaseous fuel to discharge from such zone.

2. The method of claim 1 wherein said cracking temperature is above about 800°C.

3. The method of claim 1 wherein said pyrolysis is initiated in a first enclosed pyrolysis zone which is in communication with a second enclosed pyrolysis zone containing said excess water vapor and wherein said cracking temperature is maintained to form said gaseous fuel.

4. The method of claim 3 wherein products are recovered from the effluent from said first enclosed pyrolysis zone and wherein the residue of said elluent is then passed into said second enclosed pyrolysis zone.

5. The method of claim 3 wherein external heat is applied to said first pyrolysis zone, and a portion of said gaseous end product is the source of said external heat.

6. The method of claim 1 wherein said fuel is subsequently burned to produce energy.

7. The method of claim 1 wherein oxygen is introduced into said zone in an amount sufficient to maintain said cracking temperature and render said pyrolysis self-sustaining but less than that required for complete stoichiometric combustion of said material.

8. The method of claim 7 wherein said oxygen is preheated, and said gaseous end product is the source of said preheating.

9. The method of claim 7 wherein said pyrolysis is initiated in a first enclosed pyrolysis zone which is in communication with a second pyrolysis zone containing said excess water vapor and wherein said cracking temperature is maintained to form said gaseous fuel, and the oxygen is introduced into said second zone in an amount sufficient to maintain a cracking temperature of above about 800°C. but less than that required for complete stoichiometric combustion of said material, said material in said first zone is heated indirectly by external heat, and a portion of said gaseous fuel is burned to provide such external heat applied to said first zone.

10. The method of claim 1 wherein said organic material is selected from the group consisting of fossil fuel and organic wastes.

11. The method of claim 1 wherein said organic material is kraft black liquor and said cracking temperature is such as to form essentially molecular hydrogen, methane, carbon dioxide, carbon monoxide and hydrogen sulfide as the components of said fuel, along with water vapor, said fuel is burned as a source of energy, and prior to said burning, the hydrogen sulfide is removed therefrom by absorbtion.

12. The method of processing kraft black liquor material which comprises effecting destructive distillation and pyrolysis thereof in an enclosed zone at an elevated cracking temperature and for sufficient time to form an essentially inorganic smelt and a stable clean burning fuel containing at least 10 mole percent water vapor as the gaseous end product to insure that carbon particles will react with water to form carbon monoxide and hydrogen and which contains hydrogen sulfide, preventing recombination reactions of intermediate products comprising carbon free radicals to prevent formation of saturated and unsaturated aliphatic and polynuclear aromatic atmospheric pollutants by maintaining said temperature during such destructive distillation and pyrolysis, allowing said fuel to discharge from said zone, removing the hydrogen sulfide from said fuel by absorption and discharging said smelt from said zone.

13. The method of claim 12 wherein sodium sulfide is recovered from the smelt, wherein sulfur is recovered from the absorbed hydrogen sulfide, and wherein said sodium sulfide and sulfur are reacted together to produce sodium polysulfide.

14. The method of claim 12 wherein said pyrolysis is initiated in a first enclosed pyrolysis zone to which external heat is applied, the black liquor is evaporated to solids in said first zone, and said stable fuel is formed in a second enclosed pyrolysis zone in communication with said first zone.

15. The method of claim 14 wherein organic products are recovered by condensation from the gaseous portion of the effluent from said first enclosed pyrolysis zone and wherein uncondensed gases, along with said solids formed in said zone, are then passed into said second enclosed pyrolysis zone.

16. A method for pyrolyzing malodorous sulfur-containing emission gases from a kraft wood pulping mill process comprising: introducing said emission gases into a pyrolysis unit for the continuous treatment of organic materials to remove pollutants and retaining said emission gases in said unit for a time sufficient to convert substantially all sulfur in said sulfur containing gases to hydrogen sulfide.

17. A method in accordance with claim 16 wherein said continuous treatment is accomplished in a two-stage pyrolysis unit, said introduction being directed into the second unit thereof.

18. The method of preventing formation of atmospheric pollutants and forming a stable clean burning gaseous fuel in the combustion of organic material, which comprises effecting destructive distillation and pyrolysis of said material by initiating the pyrolysis in an enclosed pyrolysis zone communicating with a second enclosed pyrolysis zone having an elevated cracking temperature of above about 800°C. and in which the material is pyrolyized for a sufficient time in the presence of an excess amount of water vapor to effect reaction of carbon particles with water to form carbon monoxide and hydrogen and to form as the gaseous end product said stable clean burning fuel containing at least 10 mole percent water vapor to insure said excess amount thereof, maintaining said temperature in said second zone to preclude recombination reactions of intermediate products comprising carbon free radicals formed during such destructive distillation and pyrolysis and thus prevent formation of gaseous saturated and unsaturated aliphatic and polynuclear aromatic pollutants, introducing oxygen into said second zone at substantially a point source to effect continuous and substantially entire consumption thereof in a limited combustion area and thereby preclude build up of free oxygen in the pyrolyizing gases and to maintain reducing conditions in said second zone, the amount of oxygen being sufficient to maintain said cracking temperature of above about 800°C. and render said pyrolysis self-sustaining but less than that required for complete stoichiometric combustion of said material, and allowing such stable clean burning fuel to discharge from said second zone.

* * * * *